US011069975B1

(12) United States Patent
Mason et al.

(10) Patent No.: US 11,069,975 B1
(45) Date of Patent: Jul. 20, 2021

(54) AIMABLE BEAM ANTENNA SYSTEM

(71) Applicant: Pivotal Commware, Inc., Kirkland, WA (US)

(72) Inventors: Timothy Hudson Mason, Kirkland, WA (US); Srinivas Sivaprakasam, Fremont, CA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

(21) Appl. No.: 16/846,670

(22) Filed: Apr. 13, 2020

(51) Int. Cl.
*H01Q 3/26* (2006.01)
*H01Q 1/24* (2006.01)
*H04W 72/12* (2009.01)
*H04W 72/04* (2009.01)

(52) U.S. Cl.
CPC ........... *H01Q 3/2676* (2013.01); *H01Q 1/246* (2013.01); *H01Q 3/26* (2013.01); *H04W 72/1289* (2013.01); *H01Q 3/2617* (2013.01); *H04W 72/0446* (2013.01)

(58) Field of Classification Search
CPC ...... H01Q 3/26; H01Q 3/2676; H01Q 3/2617; H01Q 1/246; H04B 7/0413; H04B 7/0491; H04B 7/0617; H04W 16/28; H04W 88/08; H04W 72/1289; H04W 72/0446

See application file for complete search history.

(56) References Cited

U.S. PATENT DOCUMENTS

| 2,131,108 | A | 9/1938 | Lindenblad |
| 6,133,880 | A | 10/2000 | Grangeat et al. |
| 6,150,987 | A | 11/2000 | Sole et al. |
| 7,084,815 | B2 | 8/2006 | Phillips et al. |
| 7,205,949 | B2 | 4/2007 | Turner |
| 9,356,356 | B2 | 5/2016 | Chang et al. |

(Continued)

FOREIGN PATENT DOCUMENTS

| CN | 106797074 A | 5/2017 |
| CN | 109478900 A | 3/2019 |

(Continued)

OTHER PUBLICATIONS

U.S. Appl. No. 14/510,947, filed Oct. 9, 2014, pp. 1-76.

(Continued)

*Primary Examiner* — Jae Y Lee
*Assistant Examiner* — Aixa A Guadalupe Cruz
(74) *Attorney, Agent, or Firm* — John W. Branch; Branch Partners PLLC

(57) ABSTRACT

A system that improves wireless communication between a wireless base station and a plurality of remote wireless computing user devices (UEs) based on aiming downlink wireless signals from a base station in a beam shaped waveform in a determined direction for each remote UE that is identified as allocated a time period for communication with the base station according to a schedule. The system includes different types of components may be employed to implement various functions, including an angle of arrival (AoA) detector component, a downlink protocol decoder component, and an antenna controller component. The AoA detector component may be employed to monitor one or more radio frequency (RF) wireless signals radiated by UEs that are communicating with the base station in accordance with an allocation schedule.

30 Claims, 10 Drawing Sheets

(56) References Cited

U.S. PATENT DOCUMENTS

| | | | |
|---|---|---|---|
| 9,385,435 | B2 | 7/2016 | Bily et al. |
| 9,450,310 | B2 | 9/2016 | Bily et al. |
| 9,551,785 | B1 | 1/2017 | Geer |
| 9,635,456 | B2 | 4/2017 | Fenichel |
| 9,711,852 | B2 | 7/2017 | Chen et al. |
| 9,606,416 | B2 | 10/2017 | Chen et al. |
| 9,806,414 | B2 | 10/2017 | Chen et al. |
| 9,806,415 | B2 | 10/2017 | Chen et al. |
| 9,812,779 | B2 | 11/2017 | Chen et al. |
| 10,014,948 | B2 | 7/2018 | Ashrafi |
| 10,020,891 | B2 | 7/2018 | Ashrafi |
| 10,033,109 | B1 | 7/2018 | Gummalla et al. |
| 10,153,845 | B2 | 12/2018 | Ashrafi |
| 10,225,760 | B1 | 3/2019 | Black |
| 10,313,894 | B1 | 6/2019 | Desclos et al. |
| 10,374,710 | B2 | 8/2019 | Ashrafi |
| 10,468,767 | B1 | 11/2019 | McCandless et al. |
| 10,491,303 | B2 | 11/2019 | Ashrafi |
| 10,547,386 | B2 | 1/2020 | Ashrafi |
| 10,734,736 | B1 | 8/2020 | McCandless et al. |
| 2002/0196185 | A1 | 12/2002 | Bloy |
| 2003/0025638 | A1 | 2/2003 | Apostolos |
| 2005/0237265 | A1 | 10/2005 | Durham et al. |
| 2007/0024514 | A1 | 2/2007 | Phillips et al. |
| 2008/0181328 | A1 | 7/2008 | Harel et al. |
| 2009/0207091 | A1 | 8/2009 | Anagnostou et al. |
| 2010/0248659 | A1 | 9/2010 | Kawabata |
| 2010/0302112 | A1 | 12/2010 | Lindenmeier et al. |
| 2011/0070824 | A1 | 3/2011 | Braithwaite |
| 2011/0199279 | A1 | 8/2011 | Shen et al. |
| 2012/0194399 | A1 | 8/2012 | Bliy et al. |
| 2013/0069834 | A1 | 3/2013 | Duerksen |
| 2013/0231066 | A1* | 9/2013 | Zander .............. H01Q 21/28 |
| | | | 455/73 |
| 2014/0094217 | A1 | 4/2014 | Stafford |
| 2014/0171811 | A1 | 6/2014 | Lin et al. |
| 2014/0198684 | A1* | 7/2014 | Gravely .............. H04L 43/18 |
| | | | 370/254 |
| 2014/0266948 | A1 | 9/2014 | Bily et al. |
| 2014/0293904 | A1 | 10/2014 | Dai et al. |
| 2014/0308962 | A1 | 10/2014 | Zhang et al. |
| 2015/0109178 | A1 | 4/2015 | Hyde et al. |
| 2015/0109181 | A1 | 4/2015 | Hyde et al. |
| 2015/0116153 | A1 | 4/2015 | Chen et al. |
| 2015/0162658 | A1 | 6/2015 | Bowers et al. |
| 2015/0222021 | A1 | 8/2015 | Stevenson et al. |
| 2015/0229028 | A1 | 8/2015 | Bily et al. |
| 2015/0276926 | A1 | 10/2015 | Bowers et al. |
| 2015/0276928 | A1 | 10/2015 | Bowers et al. |
| 2015/0288063 | A1 | 10/2015 | Johnson et al. |
| 2015/0318618 | A1 | 11/2015 | Chen et al. |
| 2015/0372389 | A1 | 12/2015 | Chen et al. |
| 2016/0037508 | A1 | 2/2016 | Sun |
| 2016/0079672 | A1 | 3/2016 | Cerreno |
| 2016/0087334 | A1 | 3/2016 | Sayama et al. |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0174241 | A1 | 6/2016 | Ansari et al. |
| 2016/0219539 | A1 | 7/2016 | Kim et al. |
| 2016/0241367 | A1 | 8/2016 | Irmer et al. |
| 2016/0269964 | A1 | 9/2016 | Murray |
| 2016/0345221 | A1 | 11/2016 | Axmon et al. |
| 2017/0118750 | A1 | 4/2017 | Kikuma et al. |
| 2017/0127295 | A1 | 5/2017 | Black et al. |
| 2017/0127296 | A1* | 5/2017 | Gustafsson ........... H04W 16/28 |
| 2017/0127332 | A1 | 5/2017 | Axmon et al. |
| 2017/0155192 | A1 | 6/2017 | Black et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0238141 | A1 | 8/2017 | Lindoff et al. |
| 2017/0339575 | A1 | 11/2017 | Kim et al. |
| 2017/0367053 | A1 | 12/2017 | Noh et al. |
| 2017/0373403 | A1 | 12/2017 | Watson |
| 2018/0027555 | A1 | 1/2018 | Kim et al. |
| 2018/0066991 | A1 | 3/2018 | Mueller et al. |
| 2018/0097286 | A1 | 4/2018 | Black et al. |
| 2018/0219283 | A1 | 8/2018 | Wilkins et al. |
| 2018/0227035 | A1 | 8/2018 | Cheng et al. |
| 2018/0227445 | A1 | 8/2018 | Minegishi |
| 2018/0233821 | A1 | 8/2018 | Pham et al. |
| 2018/0270729 | A1 | 9/2018 | Ramachandra et al. |
| 2018/0337445 | A1 | 11/2018 | Sullivan et al. |
| 2019/0053013 | A1* | 2/2019 | Markhovsky ......... H04W 4/025 |
| 2019/0067813 | A1 | 2/2019 | Igura |
| 2019/0221931 | A1 | 7/2019 | Black et al. |
| 2019/0289482 | A1 | 9/2019 | Black |
| 2019/0372671 | A1 | 12/2019 | Ashrafi |

FOREIGN PATENT DOCUMENTS

| | | |
|---|---|---|
| CN | 110521277 A | 11/2019 |
| EP | 3440778 A1 | 2/2019 |
| EP | 3603329 A1 | 2/2020 |
| JP | 61-1102 A | 1/1986 |
| JP | 936656 A | 2/1997 |
| JP | 200781648 A | 3/2007 |
| JP | 2007306273 A | 11/2007 |
| JP | 2014207626 A | 10/2014 |
| JP | 2017-220825 A | 12/2017 |
| JP | 2019518355 A | 6/2019 |
| KR | 10 2016 011310 A1 | 9/2016 |
| KR | 10 2016 0113100 A | 9/2016 |
| KR | 20190010545 A | 1/2019 |
| KR | 20190133194 A | 12/2019 |
| WO | 2012050614 A1 | 4/2012 |
| WO | 2015196044 A1 | 12/2015 |
| WO | 2017014842 A1 | 1/2017 |
| WO | 20170176746 A1 | 10/2017 |
| WO | 2018175615 A1 | 9/2018 |
| WO | 2018179870 A1 | 10/2018 |

OTHER PUBLICATIONS

Office Communication for U.S. Appl. No. 15/925,612 dated Jun. 15, 2018, pp. 1-17.
Office Communication for U.S. Appl. No. 15/870,758 dated Oct. 1, 2018, pp. 1-22.
Office Communication for U.S. Appl. No. 16/049,630 dated Oct. 4, 2018, pp. 1-33.
Office Communication for U.S. Appl. No. 16/136,119 dated Nov. 23, 2018, pp. 1-25.
Office Communication for U.S. Appl. No. 16/136,119 dated Mar. 15, 2019, pp. 1-19.
Office Communication for U.S. Appl. No. 16/292,022 dated Jun. 7, 2019, pp. 1-25.
Office Communication for U.S. Appl. No. 16/049,630 dated Apr. 12, 2019, pp. 1-20.
Office Communication for U.S. Appl. No. 16/268,469 dated May 16, 2019, pp. 1-29.
Office Communication for U.S. Appl. No. 16/280,939 dated May 13, 2019, pp. 1-29.
Office Communication for U.S. Appl. No. 16/440,815 dated Jul. 17, 2019, pp. 1-23.
Office Communication for U.S. Appl. No. 16/358,112 dated May 15, 2019, pp. 1-29.
International Search Report and Written Opinion for Application No. PCT/US2019/022942 dated Jul. 4, 2019, pp. 1-12.
Yurduseven et al., "Dual-Polarization Printed Holographic Multibeam Metasurface Antenna" Aug. 7, 2017, IEEE Antennas and Wireless Propagation Letters. PP. 10.1109/LAWP.2017. pp. 1-4.
International Search Report and Written Opinion for Application No. PCT/US19/022987 dated Jul. 2, 2019, pp. 1-13.
Office Communication for U.S. Appl. No. 16/440,815 dated Oct. 7, 2019, pp. 1-14.
Office Communication for U.S. Appl. No. 16/268,469 dated Sep. 10, 2019, pp. 1-37.

(56) References Cited

OTHER PUBLICATIONS

International Search Report and Written Opinion for Application No. PCT/US2019/041053 dated Aug. 27, 2019, pp. 1-15.
Office Communication for U.S. Appl. No. 16/658,096 dated Oct. 24, 2019, pp. 1-16.
International Search Report and Written Opinion for Application No. PCT/US2019/047093 dated Oct. 21, 2019, pp. 1-14.
Office Communication for U.S. Appl. No. 16/292,022 dated Sep. 23, 2019, pp. 1-32.
Office Communication for U.S. Appl. No. 16/049,630 dated Dec. 9, 2019, pp. 1-15.
Office Communication for U.S. Appl. No. 16/440,815 dated Jan. 8, 2020, pp. 1-18.
U.S. Appl. No. 62/743,672, filed Oct. 10, 2018, pp. 1-278.
Office Communication for U.S. Appl. No. 16/730,932 dated Mar. 6, 2020, pp. 1-14.
Office Communication for U.S. Appl. No. 16/049,630 dated Mar. 31, 2020, pp. 1-16.
Office Communication for U.S. Appl. No. 16/734,195 dated Mar. 20, 2020, pp. 1-9.
Office Communication for U.S. Appl. No. 16/049,630 dated Jun. 24, 2019, pp. 1-5.
Office Communication for U.S. Appl. No. 16/280,939 dated Jul. 18, 2019, pp. 1-7.
Office Communication for U.S. Appl. No. 16/049,630 dated Aug. 7, 2019, pp. 1-13.
Office Communication for U.S. Appl. No. 16/673,852 dated Jun. 24, 2020, pp. 1-11.
International Search Report and Written Opinion for Application No. PCT/US2020/016641 dated Apr. 14, 2020, pp. 1-7.
Gao, S.S. et al., "Holographic Artificial Impedance Surface Antenna Based on Circular Patch", 2018 International Conference on Microwave and Millimeter Wave Technology (ICMMT), 2018, pp. 1-3.
Nishiyama, Eisuke et al., "Polarization Controllable Microstrip Antenna using Beam Lead PIN Diodes", 2006 Asia-Pacific Microwave Conference, 2006, pp. 1-4.
International Search Report and Written Opinion for Application No. PCT/US2020/013713 dated Apr. 21, 2020, pp. 1-8.
Office Communication for U.S. Appl. No. 16/049,630 dated Aug. 19, 2020, pp. 1-18.
Office Communication for U.S. Appl. No. 16/730,932 dated Aug. 25, 2020, pp. 1-5.
Office Communication for U.S. Appl. No. 16/983,927 dated Aug. 31, 2020, pp. 1-7.
Office Communication for U.S. Appl. No. 16/983,978 dated Sep. 16, 2020, pp. 1-7.
Office Communication for U.S. Appl. No. 16/049,630 dated Oct. 15, 2020, pp. 1-16.
Office Communication for U.S. Appl. No. 16/983,978 dated Oct. 27, 2020, pp. 1-13.
International Search Report and Written Opinion for Application No. PCT/US2020/048806 dated Nov. 17, 2020, pp. 1-9.
Office Communication for U.S. Appl. No. 16/673,852 dated Nov. 25, 2020, pp. 1-8.
Office Communication for U.S. Appl. No. 16/983,927 dated Jan. 6, 2021, pp. 1-8.
Office Communication for U.S. Appl. No. 16/983,978 dated Feb. 10, 2021, pp. 1-11.

* cited by examiner

US 11,069,975 B1

AIMABLE BEAM ANTENNA SYSTEM

TECHNICAL FIELD

The invention relates generally to employing one or more antennas to employ one or more beams of wireless signals to communicate with a plurality of user devices. Further, in various embodiments, angle of arrival information for the one or more beams may be employed to multiplex a beam of downlink wireless signals from a base station between a plurality of user devices.

BACKGROUND

Mobile devices are the primary mode of wireless communication for the vast majority of people worldwide. In the first few generations of wireless communication networks, mobile devices were generally used for voice communication, text messages, and somewhat limited internet access. Each new generation of wireless communication networks has provided substantially more bandwidth for different types services for mobile device users, such as purchasing products, paying invoices, streaming movies, playing video games, online learning, dating, multimedia messaging, and more. Also, as wireless communication networks have advanced from first generation technology to fourth generation, the frequency and strength of the wireless signals have increased to provide greater bandwidth with less latency. Historically, omnidirectional and/or sector antennas have been used to communicate wireless signals between wireless devices and for each generation of wireless communication networks.

In modern 4G data systems, data rates are limited by the low directivity of sector antennas. With much higher directivities, a holographic beam forming antenna can provide much higher data rates to a UE by dynamically pointing to it when needed, but this requires knowledge of the azimuth and elevation of the UE relative to the antenna, and for more than a single UE, requires knowledge of the protocol schedule to know when each UE requires a service beam. This invention is an integrated system of an Angle of Arrival detector to sense each UE's angular location, a protocol decoder to sniff the base station downlink channel and decode the transmit and receive schedule for each UE, and a beam manager to apply this information to effect an appropriate hologram schedule to the service Holographic beam forming antenna.

DESCRIPTION OF THE VARIOUS EMBODIMENTS

Figure 1A:
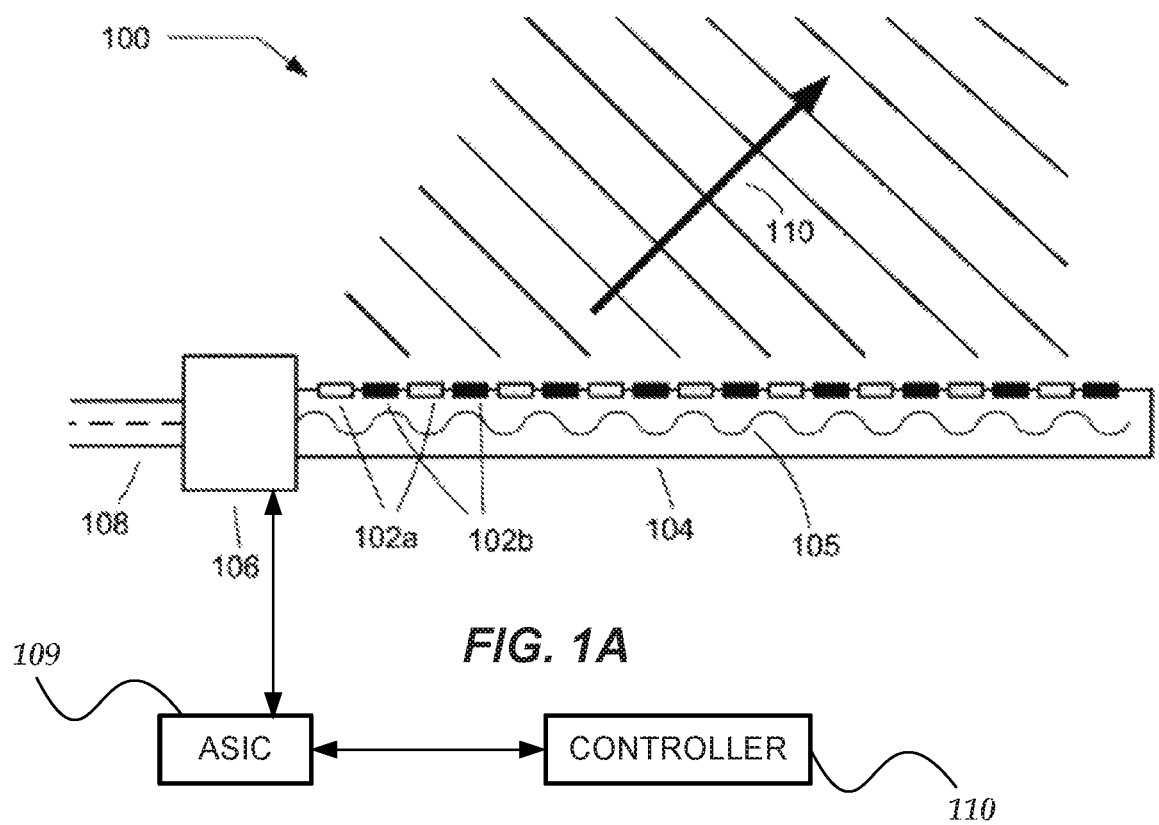
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may.

Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein, "angle of arrival" (AoA) refers to a direction from which a wireless signal is received from a remotely located wireless computing device. Measurement of the AoA is typically performed by determining the direction of propagation of a wireless signal waveforms incident on an antenna array or determined from maximum signal strength during rotation of an antenna. The antenna array includes two or more antenna elements, which may include one or different types of antenna, such as sector antennas or omnidirectional antennas. Generally, the AoA may be calculated by measuring a time difference of arrival (TDOA) between individual antenna elements in the antenna array.

In one or more embodiments, the TDOA measurement is determined by measuring the difference in the received phase of each antenna element in the antenna array. For example, in AoA determinations, the delay of arrival at each element is measured directly and converted to an AoA measurement. One application of AoA is in determining geolocation information for various types of wireless remote user computing devices, such as mobile telephones, wireless tablets, wireless modems, wireless notebooks, wireless pagers, wireless electronic book readers, and the like. Typically, multiple transceivers for a base station are employed to calculate the AoA of a particular remote wireless computing device's signal, and this AoA information is combined to determine the geolocation of the device during transmission of wireless signals received by the base station. In one or more embodiments, the AoA calculations may be determined for a wide range of electromagnetic frequencies.

As used herein, "base station" refers to a network computing device that facilitates wireless communication between a wireless network and a plurality of different types of wireless computing devices employed by users, which can also be referred to as user equipment (UE). The wireless network can be employ any type of wireless communication protocols or wireless technologies.

Briefly stated, various embodiments of the invention are directed to a method, apparatus, or a system that improves wireless communication between a wireless base station and a plurality of remote wireless computing user devices (UEs) based on aiming downlink wireless signals from a base station in a beam shaped waveform in a determined direction for each remote UE that is identified as allocated a time period for communication with the base station according to a schedule.

In one or more embodiments, an aimable beam antenna system (ABAS) includes different types of components may be employed to implement various functions, including an angle of arrival (AoA) detector component, a downlink protocol decoder component, and an antenna controller component. In one or more embodiments, the AoA detector component may be employed to monitor one or more radio frequency (RF) wireless signals radiated by at least a portion of a plurality of UEs that are communicating with the base station in accordance with an allocation schedule.

In one or more embodiments, the AoA detector component employs an array of antennas of known geometry that are synchronously digitized at the baseband frequency of the received wireless signals. By comparing a digitization of each of the wave forms for the wireless signals received by the array of antennas using pair wise cross correlations, the relative phases between the wireless signals received by each antenna can be estimated. Further, for a single incident RF Plane wave form, a relative phase as seen by each antenna is determined by its incident angle. This incident angle is used to determine the AoA by choosing an azimuth and an elevation that best fits the results of the pair wise cross correlations.

In one or more embodiments, the AoA detector component uses an allocation schedule provided by the downlink protocol decoder component to sort, in time and frequency, digitized data corresponding to the wave forms of each of the received uplink wireless signals so that data received from each UE can be processed independently and to identify each UE that is communicating with the base station at a scheduled time on an allocation schedule. In this way, the AoA detector component may analyze received uplink wireless signals communicated by an identified UE at that time without having to also process interference from other non-identified UEs that may be simultaneously communicating wireless signals. The AoA detector component provides a table of identifiers for each UE along with their azimuths and elevations relative to the antenna array to the antenna controller component, which is associated with the schedule provided by the downlink protocol decoder component.

In one or more embodiments, the downlink protocol decoder component is used to determine the schedule employed by the base station to communicate with each UE. To do so, the downlink protocol decoder component monitors the base station's downlink (transmitted) wireless signals and decodes the corresponding wireless communication protocol for wireless control signals. In one or more embodiments, the monitoring may be continuous, periodic, or dynamic.

In one or more embodiments, different wireless signals may be communicated by a base station with one or more identified UEs using different types of wireless communication protocols for different generations of wireless communication, such as 5G, 4G, 3G, or 2G. Also, these different types of wireless communication protocols may be employed for different types of control or user data services. For example, wireless signals employed for control may not require significant bandwidth or speed. Thus, these control operations may be communicated by 4G, or less generations of wireless communication protocols, such as, Long Term Evolution (LTE), Code Division Multiple Access (CDMA), Global System for Mobile Communications (GSM), Time Delay Multiple Access (TDMA), General Packet Radio Service (GPRS), WiFi, WiMax, or the like.

In one or more embodiments, an exemplary decoding process employed by the downlink protocol decoder component for the LTE protocol performs actions in part as follows: (1) synching to the primary and secondary synchronization signals to determine a cellular ID and time for synching for each UE; (2) decode a Management Information Database (MIB) to determine the bandwidth of the base station's communication with the UE; (3) extract Physical Control Format Indicator Channel (PCFICH) to determine control region numerology that is used in the Physical Downlink Control Channel (PDCCH); (4) blind decode each possible PDCCH to identify the scheduling information, and (5) employ the physical download shared channel (PDSCH) information to decode a system information block that is used to determine the uplink bandwidth. The result of the exemplary decoding process for the LTE protocol is determining a schedule that identifies a time and a frequency allocated for each identified UE for transmitting and receiving wireless signals with the base station. The downlink protocol decoder component provides the determined allocation schedule to the AoA detector component and the antenna controller component.

In one or more embodiments, the downlink protocol decoder component employs one or more antennas separate from the AoA antenna array to monitor wireless signals communicated by the base station for control information. In one or more embodiments, since the control information is typically not encrypted, the downlink protocol decoder does not need to decrypt user data communicated between the base station and identified UEs to analyze the control information. Further, in one or more embodiments, the wireless service provider or carrier that controls the base station may not know the location of each identified UE that is in communication with the base station. In one or more embodiments, the control information may include the schedule (allocation) generated by the base station as to when an identified UE can communicate (upload and download) wireless signals with the base station.

In one or more embodiments, the antenna controller component is used to generate a pointing schedule that is based on a combination of the schedule for allocating time periods to communicate with identified UEs provided by the downlink protocol decoder component and the table provided by the AoA detector component. The pointing schedule includes the azimuth, elevation, and time schedule for transmitting and receiving wireless signals with identification of each UE allocated a time period to communicate with the base station. In one or more embodiments, the pointing schedule may also include a strength of uplink wireless signals communicated by identified UEs, and one or more waveforms employed by a beam forming antenna to radiate a beam of wireless signals in the direction of each identified UE.

Also, in one or more embodiments, the antenna controller component may employ one or more waveforms configure the beam forming antenna to multiplex a generated beam of wireless downlink signals at an allocated time period in the direction defined by the azimuth and elevation corresponding to each identified UE listed in the pointing schedule and allocated for communication with the base station. Optionally, in one or more embodiments the antenna controller component may provide a gain for the beam of wireless downlink signals radiated in the direction of an identified UE based in part on a strength of an uplink wireless signal communicated by the identified UEs that is less than a minimum threshold or greater than a maximum threshold. For example, if a strength of the uplink wireless signal communicated by an identified UE is below a minimum strength threshold, the gain of the corresponding beam of wireless downlink signals may be increased to compensate for a determined distance of the identified UE from the antenna controller component which is based in part on the determined lower strength of the uplink wireless signal. Similarly, if the strength of the uplink wireless signal communicated by an identified UE is above a maximum strength threshold, the gain of the corresponding beam of wireless downlink signals may optionally decreased to compensate for a determined distance of the identified UE from the antenna controller component which is based in part on the determined higher strength of the uplink wireless signal.

Additionally, in one or more embodiments, the antenna controller component may employ two or more waveforms to configure the beam forming antenna to generate and multiplex two or more separate beams at the scheduled time in different directions defined by two or more azimuth and elevation coordinate pairs that correspond to two or more identified UE at overlapping time periods listed in the pointing schedule for communication with the base station.

Further, in one or more embodiments, the antenna controller component may include two or more separate beam forming antennas that employ two or more waveforms to generate and multiplex two or more separate beams in two different directions defined by two or more azimuth and elevation coordinate pairs that correspond to two or more identified UEs at overlapping time periods allocated in the pointing schedule. In one or more embodiments, the antenna controller component may include N separate beam forming antennas that employ N waveforms to generate and multiplex N separate beams in N different directions defined by N azimuth and elevation coordinate pairs that correspond to N identified UEs at overlapping time periods allocated in the pointing schedule.

Moreover, in one or more embodiments, the antenna controller may operate as a two by one Multiple Inputs Multiple Outputs (MIMO) antenna by including both a beam forming antenna and an omnidirectional/sector directional antenna to provide communication with an identified UE from either antenna, or both, at the same allocated time in the schedule. In one or more embodiments, the antenna controller may employ the two antennas to determine which antenna is able to provide optimal communication of wireless downlink signals to an identified UE, e.g., highest bandwidth with the lowest latency. Once the optimal determination is made for the identified UE, the antenna controller may use the determined antenna for further communication with the UE. Further, in one or more embodiments, the antenna controller may employ both a beam forming antenna and an omnidirectional/sector directional antenna to simultaneously provide communication of wireless downlink signals to two identified UEs that are allocated overlapping time periods in the pointing schedule. Also, the antenna controller may be arranged to employ one or more policies to prioritize which of the two antennas provides communication with each of two identified UEs that have overlapping time periods allocated in the pointing schedule. For example, a policy may prioritize communication by the beam forming antenna based on preselection of one of the two identified UEs, an identified UE associated with a particular carrier, or a first identified UE to respond to communication by the beam forming antenna. In this way, the antenna controller component can determine which of the two identified UEs that have overlapping time periods allocated in the pointing schedule may receive the wireless downlink signals via the beam forming antenna or the omnidirectional/sector directional antenna. In one or more embodiments, the antenna controller may employ N beam forming antennas and N omnidirectional/sector directional antennas to simultaneously provide communication of wireless downlink signals to N identified UEs that are allocated overlapping time periods in the pointing schedule.

Also, in one or more embodiments, the antenna controller may provide a particular waveform to the beam forming antenna to radiate downlink wireless signals in a widely dispersed manner, e.g., omnidirectional or sector directional, instead of in a beam for one or more identified UEs during an allocated time period on a schedule.

Also, in one or more embodiments, the beam forming antenna may include one or more holographic metasurface antennas (HMAs), or any other type of holographic beam forming antennas (HBFs). An HMA may use an arrangement of controllable elements to produce an object wave. Also, in one or more embodiments, the controllable elements may employ individual electronic circuits that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HBF can be used that is capable of producing the beams described herein.

In one or more embodiments, at least a portion of the wireless signals communicated between the beam forming antenna and one or more of the UEs are millimeter waveforms at gigahertz frequencies with $5^{th}$ Generation (5G) communication protocols. The antenna controller component combines the millimeter waveforms of the 5G wireless signals to provide a waveform to a beam forming antenna that includes a selectable shape, direction, strength, and/or phase for a beam directed towards a determined location of an identified UE during a scheduled time period allocated in the pointing schedule.

Additionally, in one or more embodiments, the antenna controller component may receive downlink wireless signals communicated by the base station for each identified UE on the schedule with one or more of base station antennas or optional base station beam antennas coupled to the ABAS. The base station antennas and/or base station beam antennas may be arranged to receive the downlink wireless signals transmitted by one or more antennas corresponding to the base station. In one or more embodiments, the antenna controller component may multiplex the received downlink wireless signals for retransmission in a beam waveform in the direction of each identified UE. The one or more base station antennas may be omnidirectional or directional antennas that are arranged to communicate wireless signals. Also, the optional one or more base station beam antennas may be arranged to retransmit the received downlink wireless signals in a beam waveform in the direction of each identified UE. In this way, the antenna controller can receive beam or non-beam downlink wireless signals communicated in 5G or 4G protocols from the base station, and then multiplex the received wireless signals for retransmission of the received downlink signals in a beam waveform to each identified UE.

Further, in one or more embodiments, the beam antenna may include one or more of an HBF antenna, a parabolic antenna, a spherical antenna, a helical antenna, a yagi antenna, a horn antenna, or a phased array antenna. Also, in one or more embodiments, the frequencies of the uplink and/or downlink wireless signals may vary widely, e.g., as low as 600 Mega Hertz or as high as 72 Giga Hertz.

Additionally, the ABAS may provide information regarding one or more of the identified UEs or non-identified UEs to one or more of carriers, organizations, or other entities, for different uses, e.g., emergency services, security services, advertising or marketing. The provided information may include one or more of azimuth, elevation, carrier associated with a UE, or strength of wireless signals communicated between the UE and the antenna controller component. Also, the provided information may include a determined location of a UE.

Illustrated Operating Environment

FIG. 1A illustrates one embodiment of a holographic metasurface antenna (HMA) which takes the form of a surface scattering antenna 100 that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC) 109 is employed to control the operation of the row of scattering elements 102a and 102b. Further, controller 110 may be employed to control the operation of one or more ASICs that control one or more rows in the array.

Figure 1B:
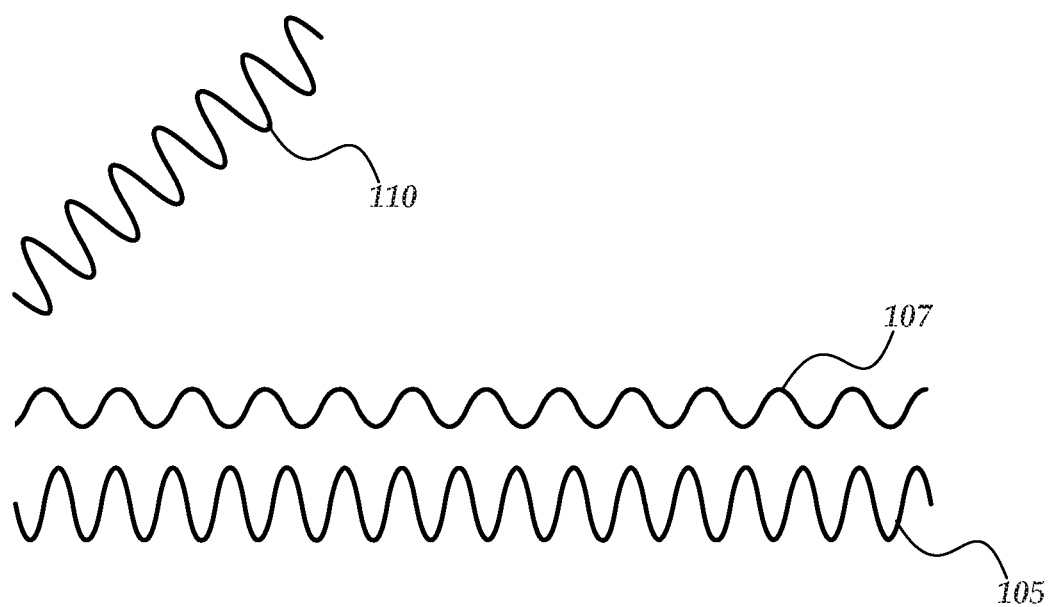
FIG. 1B shows a representation of one embodiment of a synthetic array illustrating a reference waveform and a hologram waveform (modulation function) that in combination provide an object waveform of electromagnetic waves.
Figure 1C:
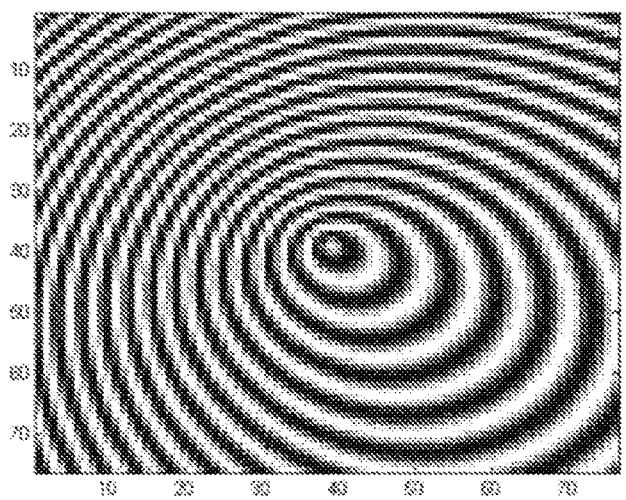
FIG. 1C shows an embodiment of an exemplary modulation function for an exemplary surface scattering antenna.
Figure 1D:
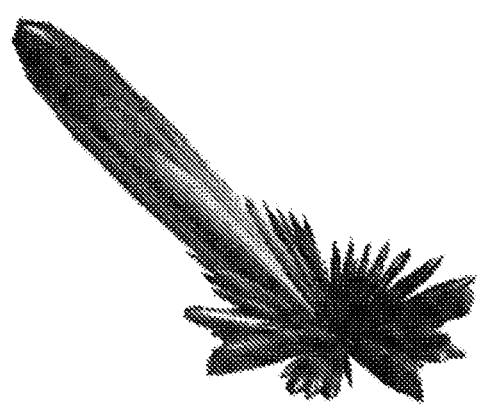
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^{*}\psi_{obj}$. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 1E:
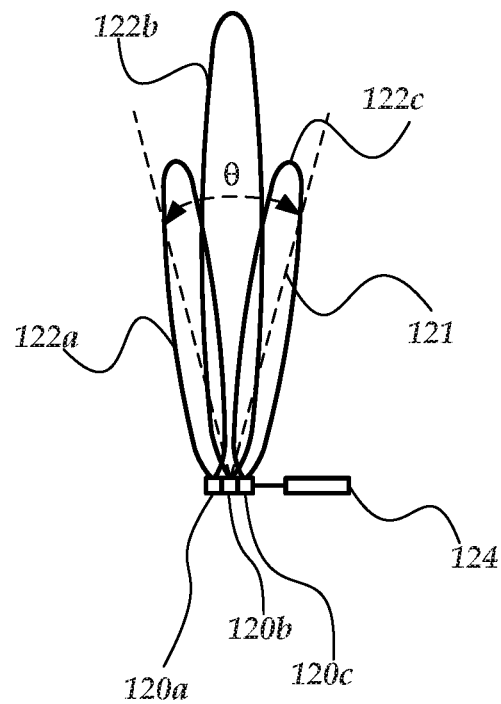
FIG. 1E shows a side view of another embodiment of an exemplary arrangement of multiple instances of HMAs.
Figure 1F:
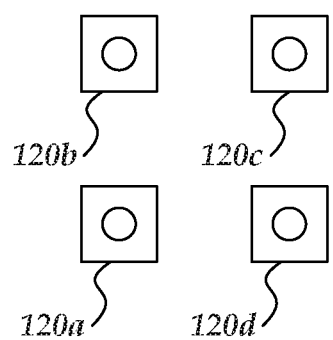
FIG. 1F shows a top view of yet another embodiment of an exemplary arrangement of multiple instances of HMAs.

FIG. 1E illustrates an arrangement of HMAs 120a, 120b, 120c that produce beams 122a, 122b, 122c where the middle beam 122b is substantially different in size and shape from the other two beams 122a, 122c. FIG. 1F illustrates, in a top view, yet another arrangement of HMAs 120a, 120b, 120c, 120d which form a two-dimensional array.

Also, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 1E and 1F.

Figure 2A:
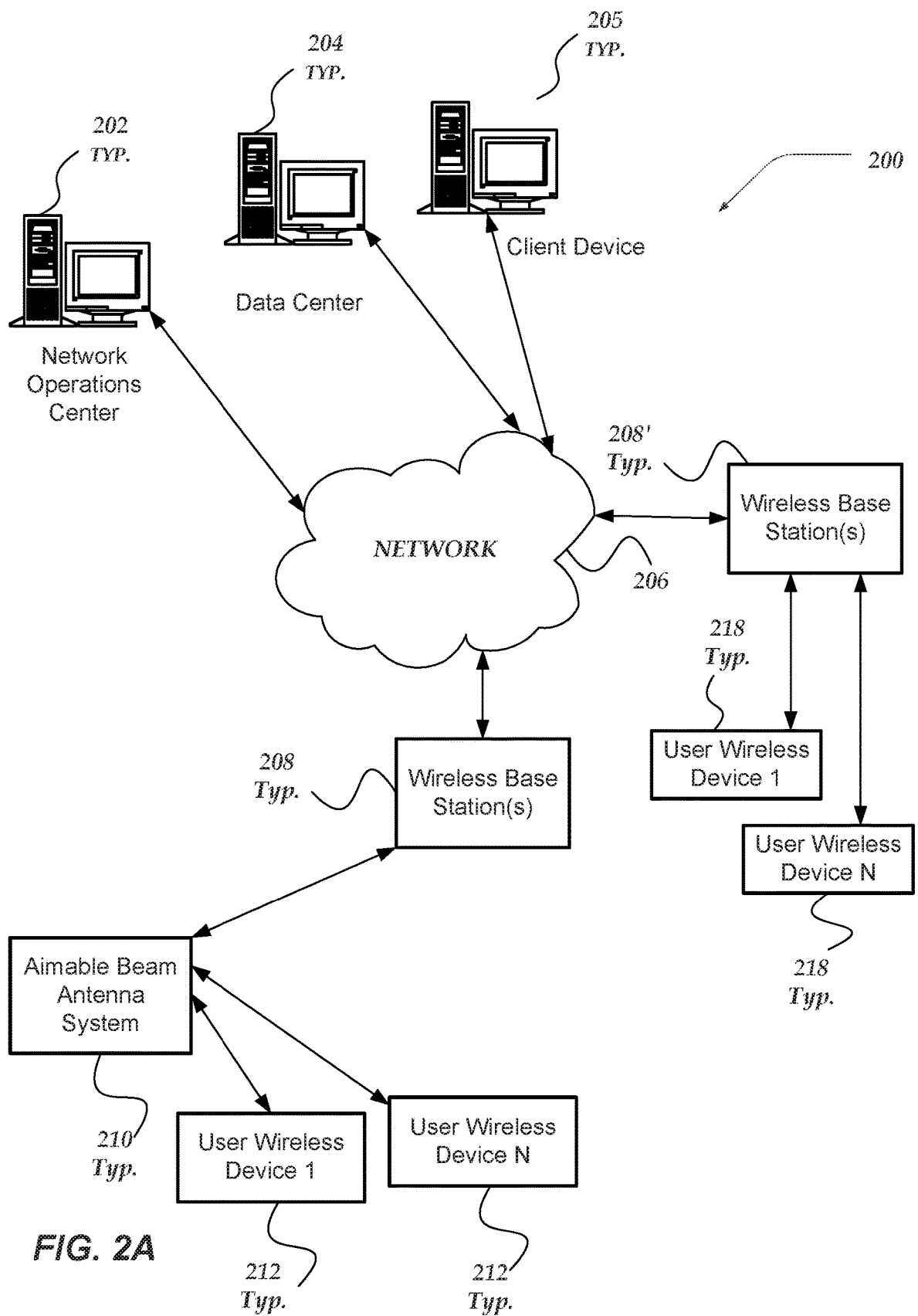
FIG. 2A shows a top view of an embodiment of an exemplary environment, including an arrangement of a network operations center, wireless signal base station, network and multiple wireless user devices, in which various embodiments of the invention may be implemented.

As shown in FIG. 2A, an overview of system 200 is illustrated for communicating data from one or more data centers 204 which employs one or more network operations centers 202 to route the data to one or more remote wireless base stations 208 that communicate the data in the form of RF wireless signals to one or more user wireless devices (UEs) 212 and 218. As shown, the data is communicated from one or more data centers 204 and routed in part by one or more NOCs 202 over network 206 to a plurality of remote wireless base stations 208' that wirelessly communicate the data directly with one or more UEs 218, or a plurality of remote wireless base stations 208 that employ one or Aimable Beam Antenna Systems 210 (ABAS) to multiplex communication with UEs 212. One or more user wireless devices (UEs) 212 are in communication with ABAS 210 which is arranged to multiplex communication of one or more of downlink wireless signals or uplink wireless signals communicated between wireless base station 208 and one or more identified UEs 212. Also, one or more client devices 205 may execute an app that provides remote analysis and control of the one or more ABAS 210. Although not shown, wireless base station 208 may also communicate directly with one or more UEs, while also multiplexing communication through ABAS 210 with the same or other UEs.

Although not shown, ABAS 210 may be a separate device that employs an interface to directly communicate wireless signals with base station 208 through a physical connection, such as a coaxial fiber cable, waveguide, or other type of cable capable of communicating at least uplink and downlink wireless signals between the ABAS and the base station.

Network 206 may be configured to couple network operation center computers with other computing devices, including wireless base station 208. Network 206 may include various wired and/or wireless technologies for communicating with a remote device, such as, but not limited to, USB cable, Bluetooth®, Wi-Fi®, or the like. In some embodiments, network 206 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 206 may be enabled to employ various forms of communication technology, topology, computer-readable media, or the like, for communicating information from one electronic device to another. For example, network 206 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 206 may include various communication technologies by which information may travel between computing devices.

Network 206 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 206 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MIMS), or various ones of a variety of other communication protocols and/or technologies.

In various embodiments, at least a portion of network 206 may be arranged as an autonomous system of nodes, links, paths, terminals, gateways, routers, switches, firewalls, load balancers, forwarders, repeaters, optical-electrical converters, base stations, or the like, which may be connected by various communication links. These autonomous systems may be configured to self-organize based on current operating conditions and/or rule-based policies, such that the network topology of the network may be modified.

Figure 2B:
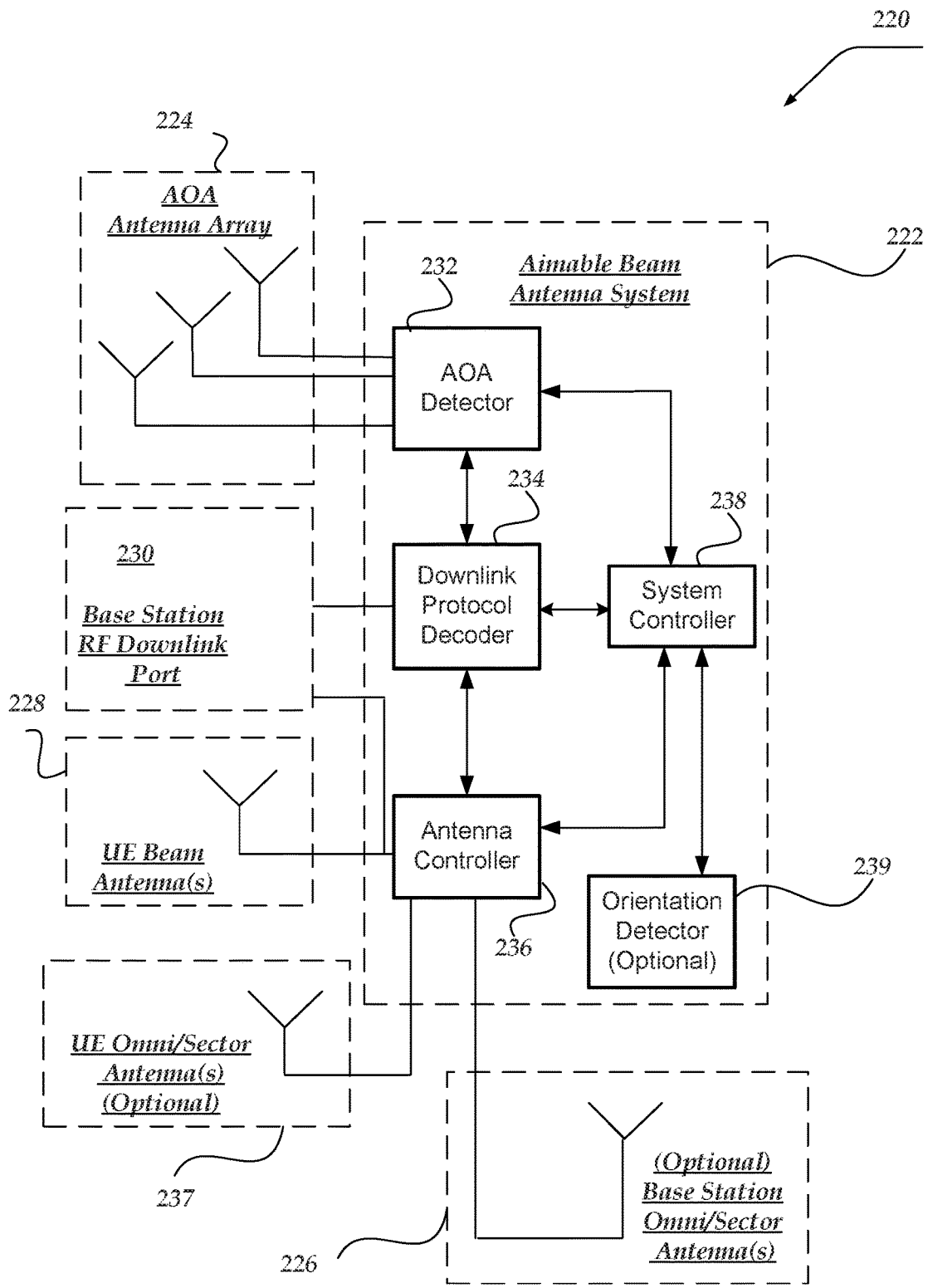
FIG. 2B shows an exemplary embodiment of an aimable beam antenna system that is remotely located from a wireless base station.

FIG. 2B illustrates an exemplary schematic overview 220 of aimable beam antenna system (ABAS) 222, which is coupled to Angle of Arrival (AoA) antenna array component 224, one or more optional base station omnidirectional/sector directional antenna components 226, one or more optional UE omnidirectional/sector directional antenna components 237, one or more UE beam antenna components 228, and one or more radio frequency RF inputs (not shown) connected to one or more base station radio frequency (RF) downlink ports 230. In one or more embodiments, a physical connection between the one or more RF inputs and the one or more base station downlink RF ports 230 is provided by one of a coaxial fiber cable, a waveguide, or another conductive component that is arranged to communicate downlink RF signals between ABAS 222 and the base station.

ABAS 222 includes system controller 238 which manages the operation of several components, including AoA detector component 232, downlink protocol decoder component 234, antenna controller 236, and optional orientation detector component 239. AoA detector component 232 is coupled to AoA array antennas component 224.

As shown, AoA detector component 232 is arranged to employ AoA antenna array 224 to determine an azimuth and an elevation that best fits uplink wireless RF signals communicated to a base station by remotely located UEs. Also, AoA detector component 232 may use a schedule provided by downlink protocol decoder component 234 to sort, in time and frequency, digitized data corresponding to the wave forms of each of the received uplink wireless RF signals so that the data received from each UE can be processed independently and separately identify each UE that is communicating with the base station at a scheduled time. AoA detector component 232 provides a table of identifiers for each UE along with their azimuths and elevations relative to AoA antenna array 234, which is associated with the schedule provided by the downlink protocol decoder component.

As shown, downlink protocol decoder component 234 employs downlink RF signals communicated by the base station through one or more RF inputs that are connected to one or more base station RF downlink ports 230 to determine the schedule employed by the base station to communicate with a plurality of identified UEs. Downlink protocol decoder component 234 monitors the downlink RF signals for control information by decoding its corresponding one or more wireless communication protocols, which in some circumstances may include a 4G protocol such as Long Term Evolution (LTE).

Additionally, an exemplary decoding process employed by downlink protocol decoder component 234 for the LTE protocol includes at least in part as follows: (1) synching to the primary and secondary synchronization signals to determine a cellular ID and time for synching for each UE; (2) decode a Management Information Database (MIB) to determine the bandwidth of the base station's communication with the UE; (3) extract Physical Control Format Indicator Channel (PCFICH) to determine control region numerology that is used in the Physical Downlink Control Channel (PDCCH); (4) blind decode each possible PDCCH to identify the scheduling information; and (5) employ the physical download shared channel (PDSCH) information to decode a system information block that is used to determine the uplink bandwidth. The result of the decoding process for the LTE protocol is determining a schedule that identifies a time and a frequency allocation for each UE for transmitting and receiving wireless RF signals with the base station. In this way, downlink protocol decoder component 234 is able to provide the determined schedule to AoA detector component 232 and antenna controller component 236. Additionally, a similar decoding process, albeit different in some ways, may be employed to decode other wireless communication protocols, such as other 4G protocols and/or 5G protocols.

As shown, downlink protocol decoder component 234 employs an RF input (not shown) connected to base station RF downlink port 230 to monitor downlink RF signals for control information broadcast by the base station. In one or more embodiments, the control information is not encrypted or encoded. Further, in one or more embodiments, downlink protocol decoder component 234 does not decrypt or read user data communicated between the base station and one or more UEs. Further, in one or more embodiments, a wireless service provider or carrier that controls the base station may not know a location of each identified UE that is in communication with the base station. Also, the control information may include a schedule for the base station that allocates a time period when each identified UE is enabled for communication of wireless signals (uplink and downlink) with the base station.

Furthermore, downlink protocol decoder component 234 may provide additional information regarding one or more of the identified UEs in communication with the base station to the carrier which controls the base station or another carrier for different purposes, including emergency services, security services, advertising or marketing. The provided information may include one or more of azimuth, elevation, carrier, or a determined location of one or more identified UEs, or a strength of wireless signals communicated between the UE and a beam antenna operated by antenna controller component 236.

In one or more embodiments, antenna controller component 236 generates a pointing schedule based on a combination of the allocation schedule provided by downlink protocol decoder component 234 and the table provided by AoA detector component 232. The pointing schedule includes the azimuth, elevation, and time schedule for transmitting and receiving wireless signals with each UE identified to be in communication with the base station. In one or more embodiments, the pointing schedule may also include a strength of uplink wireless signals communicated by identified UEs, and one or more waveforms employed by a beam forming antenna to radiate a beam of wireless signals in the direction of each identified UE.

Also, in one or more embodiments, antenna controller component 236 may employ the one or more waveforms to configure UE beam forming antenna 228 to generate a beam of wireless downlink RF signals broadcast by the base station at a scheduled time in the direction defined by the azimuth and elevation corresponding to each identified UE listed in the pointing schedule. Additionally, in one or more embodiments, antenna controller component 236 may provide a gain for the beam of wireless downlink RF signals radiated in the direction of an identified UE based on a strength of uplink wireless RF signals from identified UEs that are monitored by AoA detector component 232 with AoA antenna array 224.

Additionally, in one or more embodiments, the antenna controller component 236 may receive downlink wireless RF signals communicated by the base station for each identified UE on the schedule with one or more of the optional omnidirectional/sector directional base station antennas 226. In this way, ABAS 222 may employ base station antennas 226 to receive the downlink RF signals wirelessly transmitted by one or more types of antennas (not shown) employed by the base station (not shown). Further, the received downlink RF signals may be retransmitted as a beam waveform that is radiated in the direction of each identified UE at the corresponding time periods allocated in the pointing schedule. Also, the antenna controller 236 can receive downlink RF signals communicated in 5G or 4G protocols from the base station, and then multiplex the retransmission of the received downlink RF signals to each identified UE. Additionally, in one or more embodiments, UE beam antenna 228 may include one or more a holographic beam forming (HBF) antenna, a parabolic antenna, a spherical antenna, a helical antenna, a yagi antenna, a horn antenna, a phased array antenna, or the like.

As shown, optional orientation detector component 239 may be employed to identify a physical position of the ABAS 222 generally, and more specifically the orientation and physical position of UE beam antenna 228. Although not shown, orientation detector component 239 may include one or more of an accelerometer, gyroscope, compass, altimeter, or a global positioning system (GPS) component.

Additionally, as shown, system controller component 238 is in communication with AoA detector component 232, downlink protocol decoder component 234, antenna controller component 236, and optional orientation detector component 239. System controller component 238 is employed to manage and coordinate the operation of the other components. Also, in one or more embodiments, system controller component 238 is employed to communicate with one or more client computers (not shown) that are employed to remotely manage the operation of ABAS 222.

Also, the system controller component 238 may provide information regarding one or more of the identified UEs or non-identified UEs to one or more of carriers, organizations, or other entities, for different uses, e.g., emergency services, security services, advertising or marketing. The provided information may include one or more of azimuth, elevation, carrier associated with a UE, or strength of wireless RF signals communicated between the UE and the antenna controller component. Also, the provided information may include a determined location of a UE.

Additionally, in one or more embodiments (not shown in the figures), system controller component 238 may include one or more processor devices, or embedded logic hardware devices, such as, an Application Specific Integrated Circuits (ASICs), Field Programmable Gate Arrays (FPGAs), Programmable Array Logics (PALs), or the like, or combination thereof. The one or more processor devices or embedded logic hardware devices may directly execute one or more of embedded logic or logic stored in a memory to perform actions to manage the operation of other components. Also, in one or more embodiments (not shown in the figures), system controller component 238 may include one or more hardware microcontrollers instead of processor devices. In one or more embodiments, the one or more microcontrollers may directly execute their own embedded logic or logic stored in memory to perform actions and access their own internal memory and their own external Input and Output Interfaces (e.g., hardware pins and/or wireless transceivers) to perform actions, such as System On a Chip (SOC), or the like.

Additionally, in one or more embodiments, antenna controller component 236 may employ two or more waveforms to configure UE beam forming antenna component 228 to generate two or more separate beams at the scheduled time in different directions defined by two or more azimuth and elevation coordinate pairs that correspond to two or more identified UE listed in the pointing schedule and allocated a time period to communicate with the base station.

Further, in one or more embodiments, antenna controller component 236 may employ two or more waveforms to configure two or more separate UE beam forming antennas 228 to generate two or more separate beams at the scheduled time in different directions defined by two or more azimuth and elevation coordinate pairs that correspond to two or more identified UE listed in the pointing schedule and allocated a time period to communicate with the base station.

Moreover, in one or more embodiments, antenna controller component 236 may facilitate an arrangement of a two to one Multiple Inputs Multiple Outputs (MIMO) antenna by using both UE beam forming antenna 228 and optional UE omnidirectional/sector directional antenna 237 to provide communication with an identified UE during allocated time periods in the pointing schedule. In one or more embodiments, antenna controller component 236 may employ these two antennas to determine which antenna is able to provide the optimal, e.g., best bandwidth with the lowest latency to communicate downlink RF signals to an identified UE. Once the optimal determination is made for the identified UE, antenna controller component 236 may use the determined antenna for further communication of downlink RF signals with the UE.

Further, in one or more embodiments, antenna controller component 236 may employ both UE beam forming antenna 228 and optional omnidirectional/sector directional antenna 237 to simultaneously provide communication of wireless downlink RF signals to at least two different identified UEs that are simultaneously allocated time periods in the pointing schedule for communication with the base station. Also, antenna controller component 236 may be arranged to employ one or more policies to determined which of these two antennas provides simultaneous communication with each of the at least two UEs. For example, a policy may prioritize communication by UE beam forming antenna 228 with a preselected UE, or the first UE to respond to wireless control signals, when simultaneous communication with two or more UEs occurs. Based on the policy, one UE may communicate via UE beam forming antenna 228 and the other UE would communicate via optional UE omnidirectional/sector directional antenna 237. Also, in one or more embodiments, antenna controller component 236 may provide one or more waveforms to the beam forming antenna to cause radiation of wireless downlink RF signals omnidirectionally instead of in a shaped beam for one or more identified UEs during an allocated time period on the pointing schedule.

Figure 2C:
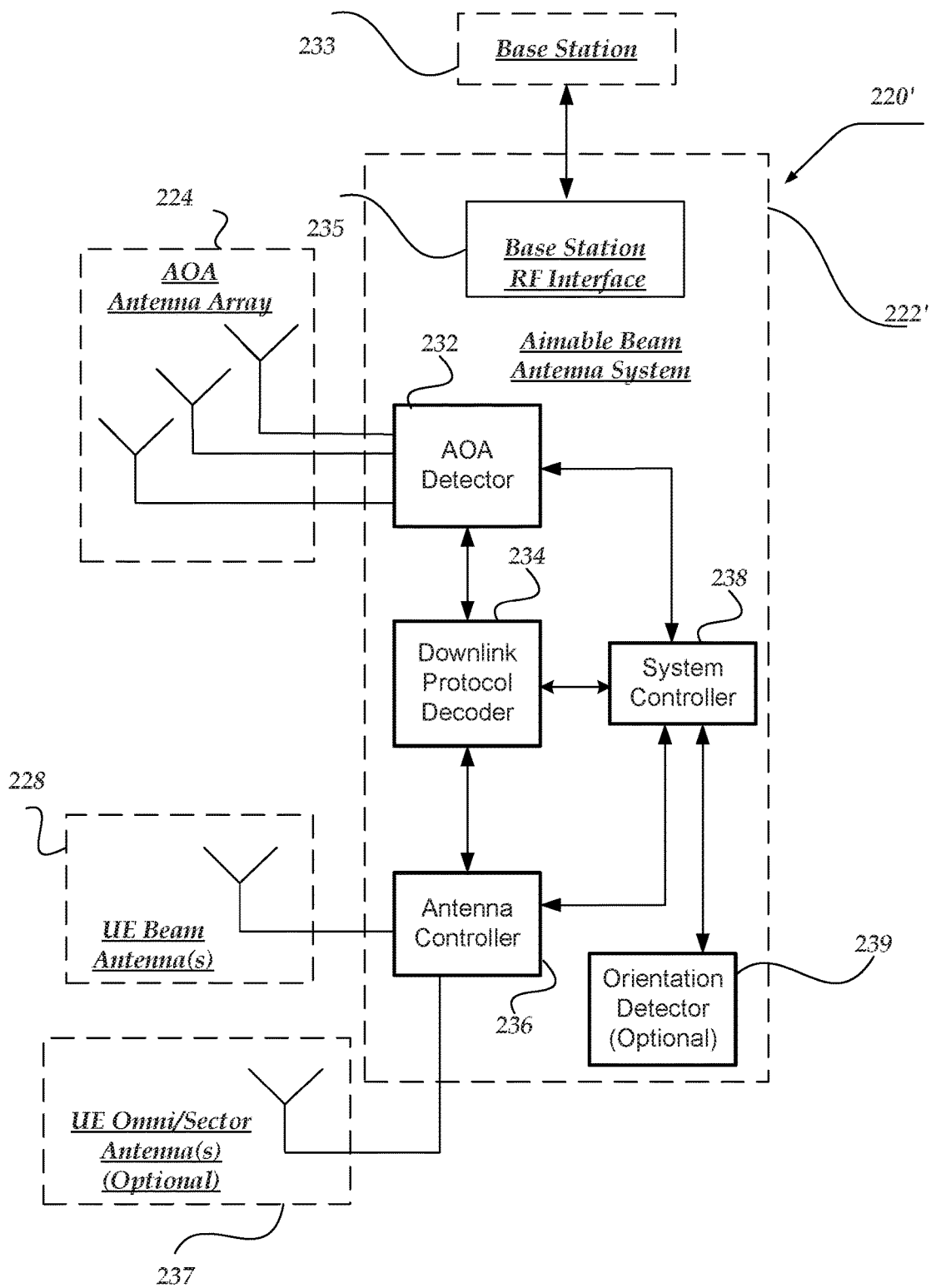
FIG. 2C shows an exemplary embodiment of an aimable beam antenna system that provides an interface to directly couple RF signal communicated by a separate wireless base station.

FIG. 2C illustrates an exemplary schematic overview 220' of aimable beam antenna system (ABAS) 222', which is coupled to Angle of Arrival (AoA) antenna array component 224, one or more optional UE omnidirectional/sector directional antenna component 237, one or more UE beam antenna component 228, and base station 233.

ABAS 222' includes system controller 238 which manages the operation of several components, including AoA detector component 232, downlink protocol decoder component 234, antenna controller 236, base station radio frequency (RF) interface component 235 and optional orientation detector component 239. Also, AoA detector component 232 is coupled to AoA array antennas component 224.

In this arrangement, ABAS 222' is directly coupled to RF signals communicated by base station 233 through base station interface 235, and operates substantially similar to ABAS 222, albeit somewhat differently. In one or more embodiments, wireless downlink RF signals directly monitored over base station interface 235 are used to determine the schedule for multiplexing communication of downlink RF signals with identified UEs. Further, interface 235 is arranged to directly communicate RF signals with the base station through a direct coupling of the base station RF interface 235 of ABAS 222' to base station 233.

Figure 2D:
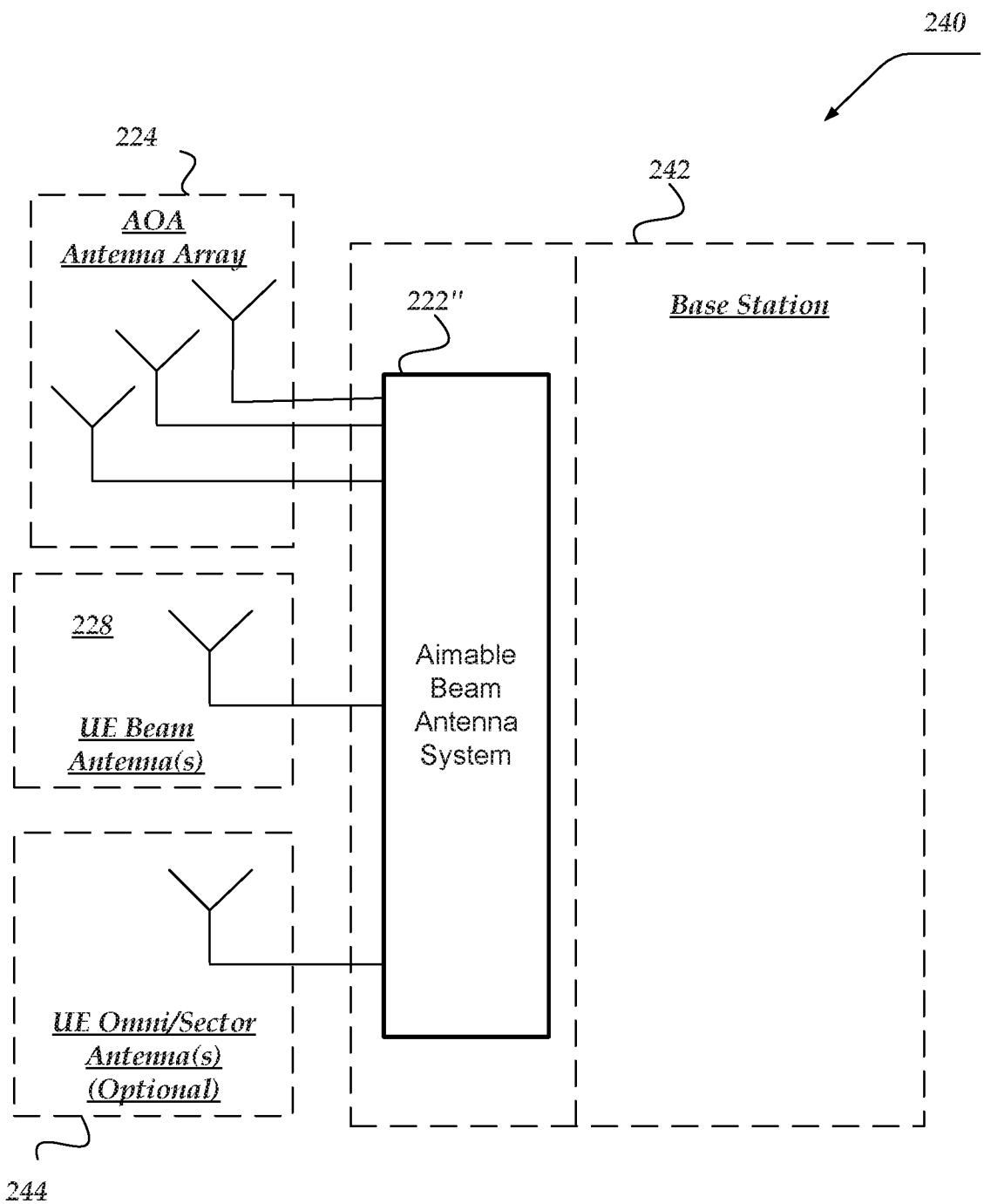
FIG. 2D shows an exemplary embodiment of an aimable beam antenna system that is integrated with a wireless base station.

FIG. 2D illustrates a schematic overview 240 of an aimable beam antenna system (ABAS) 222" that is integrated with base station 242 and operates substantially similar to ABAS 222 and/or 222', albeit somewhat differently. Also, as shown, ABAS 222" is coupled to AoA antenna array component 224, one or more UE beam antenna components 228, and one or more optional UE Omni/Sector Antenna components 244.

In one or more embodiments, an antenna controller component and the AoA component (neither shown) of ABAS 222" is provided the schedule for multiplexing communication with identified UEs directly from the base station instead of employing a separate download decoder protocol component to determine and the schedule by monitoring downlink RF signals.

Illustrative Client Computer

Figure 3:
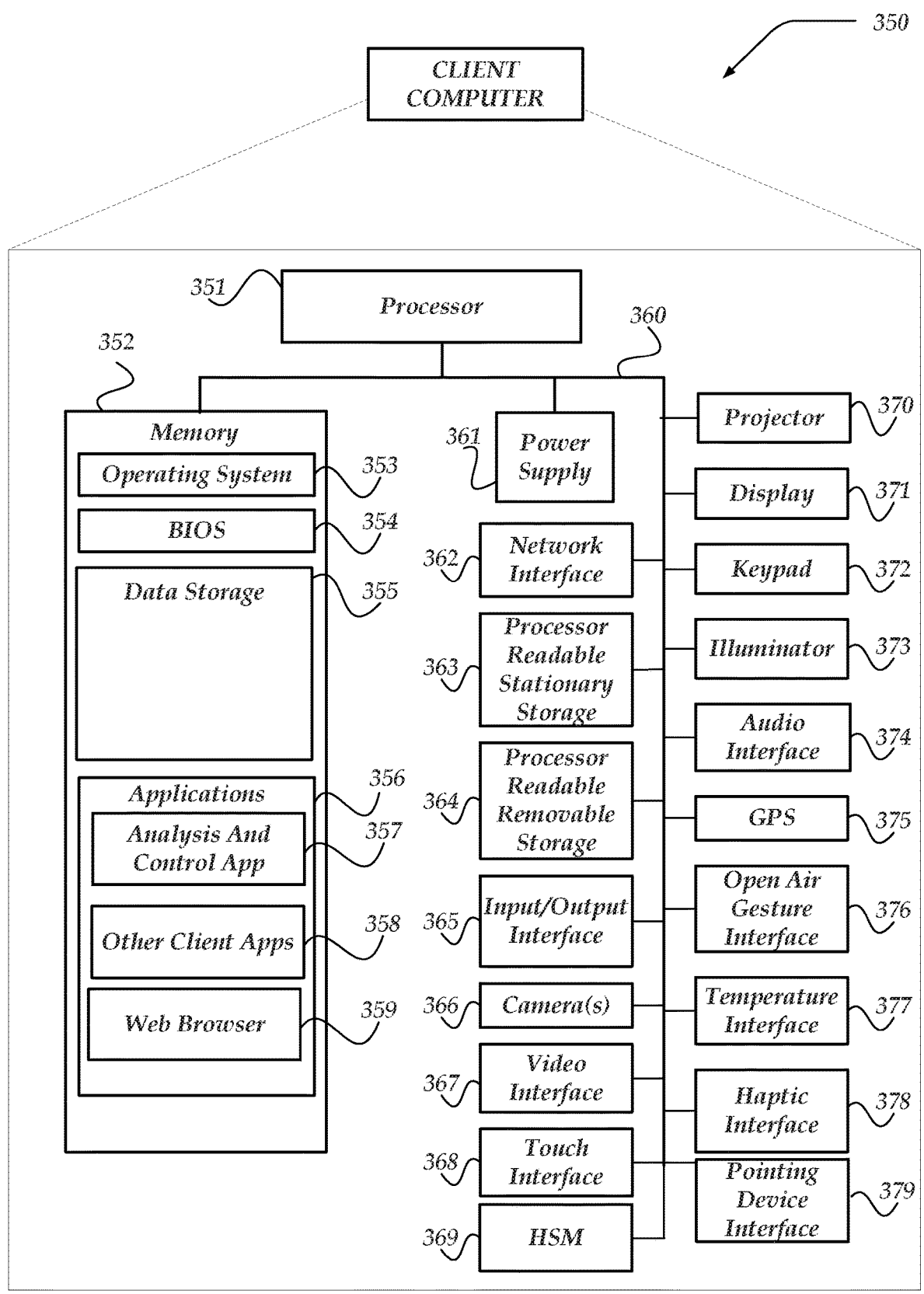
FIG. 3 shows an embodiment of an exemplary client computer device that may be included in a system such as that shown in FIG. 2A.

FIG. 3 shows one embodiment of client computer 350 that may include many more, or less, components than those shown. Client computer 350 may represent, for example, at least one embodiment of mobile computers or client computers shown in FIG. 2A.

Client computer 350 may include processor 351 in communication with memory 352 via bus 360. Client computer 350 may also include power supply 361, network interface 362, audio interface 374, display 371, keypad 372, illuminator 373, video interface 367, input/output interface 365, haptic interface 378, global positioning systems (GPS) receiver 375, open air gesture interface 376, temperature interface 377, camera(s) 367, projector 370, pointing device interface 379, processor-readable stationary storage device 363, and processor-readable removable storage device 364. Client computer 350 may optionally communicate with a base station (not shown), an Aimable Beam Antenna System (not shown) or directly with another computer. Power supply 361 may provide power to client computer 350. A rechargeable or non-rechargeable battery may be used to provide power. The power may also be provided by an external power source, such as an AC adapter or a powered docking cradle that supplements or recharges the battery.

Network interface 362 includes circuitry for coupling client computer 350 to one or more networks, and it is constructed for use with one or more wired and/or wireless communication protocols and technologies. Examples of various generations (e.g., third (3G), fourth (4G), or fifth (5G)) of communication protocols and/or technologies may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), 5G New Radio (5G NR), 5G Technical Forum (5G TF), 5G Special Interest Group (5G SIG), Narrow Band Internet of Things (NB IoT), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies.

Audio interface 374 may be arranged to produce and receive audio signals such as the sound of a human voice. For example, audio interface 374 may be coupled to a speaker and microphone (not shown) to enable telecommunication with others or generate an audio acknowledgement for some action. A microphone in audio interface 374 can also be used for input to or control of client computer 350, e.g., using voice recognition, detecting touch based on sound, and the like.

Display 371 may be a liquid crystal display (LCD), gas plasma, electronic ink, light emitting diode (LED), Organic LED (OLED) or any other type of light reflective or light transmissive display that can be used with a computer. Display 371 may also include a touch interface 368 arranged to receive input from an object such as a stylus or a digit from a human hand, and may use resistive, capacitive, surface acoustic wave (SAW), infrared, radar, or other technologies to sense touch or gestures.

Projector 370 may be a remote handheld projector or an integrated projector that is capable of projecting an image on a remote wall or any other reflective object such as a remote screen.

Video interface 367 may be arranged to capture video images, such as a still photo, a video segment, an infrared video, or the like. For example, video interface 367 may be coupled to a digital video camera, a web-camera, or the like. Video interface 367 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 372 may comprise any input device arranged to receive input from a user. For example, keypad 372 may include a push button numeric dial, or a keyboard. Keypad 372 may also include command buttons that are associated with selecting and sending images.

Illuminator 373 may provide a status indication or provide light. Illuminator 373 may remain active for specific periods of time or in response to event messages. For example, when illuminator 373 is active, it may backlight the buttons on keypad 372 and stay on while the client computer is powered. Also, illuminator 373 may backlight these buttons in various patterns when particular actions are performed, such as dialing another client computer. Illuminator 373 may also enable light sources positioned within a transparent or translucent case of the client computer to illuminate in response to actions.

Further, client computer 350 may also comprise hardware security module (HSM) 369 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 369 may be a stand-alone computer, in other cases, HSM 369 may be arranged as a hardware card that may be added to a client computer.

Client computer 350 may also comprise input/output interface 365 for communicating with external peripheral devices or other computers such as other client computers and network computers. The peripheral devices may include an audio headset, virtual reality headsets, display screen glasses, remote speaker system, remote speaker and microphone system, and the like. Input/output interface 365 can utilize one or more technologies, such as Universal Serial Bus (USB), Infrared, WiFi, WiMax, Bluetooth™, and the like.

Input/output interface 365 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 350.

Haptic interface 378 may be arranged to provide tactile feedback to a user of the client computer. For example, the haptic interface 378 may be employed to vibrate client computer 350 in a particular way when another user of a computer is calling. Temperature interface 377 may be used to provide a temperature measurement input or a temperature changing output to a user of client computer 350. Open air gesture interface 376 may sense physical gestures of a user of client computer 350, for example, by using single or stereo video cameras, radar, a gyroscopic sensor inside a computer held or worn by the user, or the like. One or more cameras 366 may be used by an application to employ facial recognition methods to identify a user, track the user's physical eye movements, or take pictures (images) or videos.

GPS device 375 can determine the physical coordinates of client computer 350 on the surface of the Earth, which typically outputs a location as latitude and longitude values. GPS device 375 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 350 on the surface of the Earth. It is understood that GPS device 375 can employ a gyroscope to determine an orientation and/or an accelerometer to determine movement of the client computer 350. In one or more embodiment, however, client computer 350 may, through other components, provide other information that may be employed to determine a physical location of the client computer, including for example, a Media Access Control (MAC) address, IP address, and the like.

Human interface components can be peripheral devices that are physically separate from client computer 350, allowing for remote input or output to client computer 350. For example, information routed as described here through human interface components such as display 371 or keypad 372 can instead be routed through network interface 362 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Client computer 350 may include analysis and control app 357 that may be configured to remotely manage operation of an ABAS that is separate from a base station or the ABAS is integrated with a base station such as shown in FIGS. 2B and 2C. App 357 may provide information and metrics regarding communication of a remote wireless base station with a plurality of identified UEs. Also, app 357 may authorize and enable different types of users (e.g., technicians, customers, and the like) to use a displayed interface to quickly identify and troubleshoot technical problems, assist in orientation of beam waveforms generated by beam antennas to provide an optimal wireless communication downlink between a remote wireless base station and a plurality of identified UEs. The app may also enable adjustment of particular performance parameters to improve one or more aspects of the operation of the beam antennas. In one or more embodiments, app 357 may employ Bluetooth, wife, or any other wireless or wired communication link to communicate with the RF communication device.

Client computer 350 may include web browser application 359 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 352 may include RAM, ROM, or other types of memory. Memory 352 illustrates an example of computer-readable storage media (devices) for storage of information such as computer-readable instructions, data structures, program modules or other data. Memory 352 may store BIOS 354 for controlling low-level operation of client computer 350. The memory may also store operating system 353 for controlling the operation of client computer 350. It will be appreciated that this component may include a general-purpose operating system such as a version of UNIX, or LINUX™, or a specialized client computer communication operating system such as Windows Phone™, Apple iOS™ or the Symbian® operating system. The operating system may include, or interface with a Java virtual machine module that enables control of hardware components or operating system operations via Java application programs.

Memory 352 may further include one or more data storage 355, which can be utilized by client computer 350 to store, among other things, applications 356 or other data. For example, data storage 355 may also be employed to store information that describes various capabilities of client computer 350. The information may then be provided to another device or computer based on any of a variety of methods, including being sent as part of a header during a communication, sent upon request, or the like. Data storage 355 may also be employed to store social networking information including address books, buddy lists, aliases, user profile information, or the like. Data storage 355 may further include program code, data, algorithms, and the like, for use by a processor, such as processor 351 to execute and perform actions. In one embodiment, at least some of data storage 355 might also be stored on another component of client computer 350, including, but not limited to, non-transitory processor-readable removable storage device 364, processor-readable stationary storage device 363, or even external to the client computer.

Applications 356 may include computer executable instructions which, when executed by client computer 350, transmit, receive, or otherwise process instructions and data. Applications 356 may include, for example, analysis and control app 357, other client applications 358, web browser 359, or the like. Client computers may be arranged to exchange communications, such as, queries, searches, messages, notification messages, event messages, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 350 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 350 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Generalized Operations

Figure 4A:
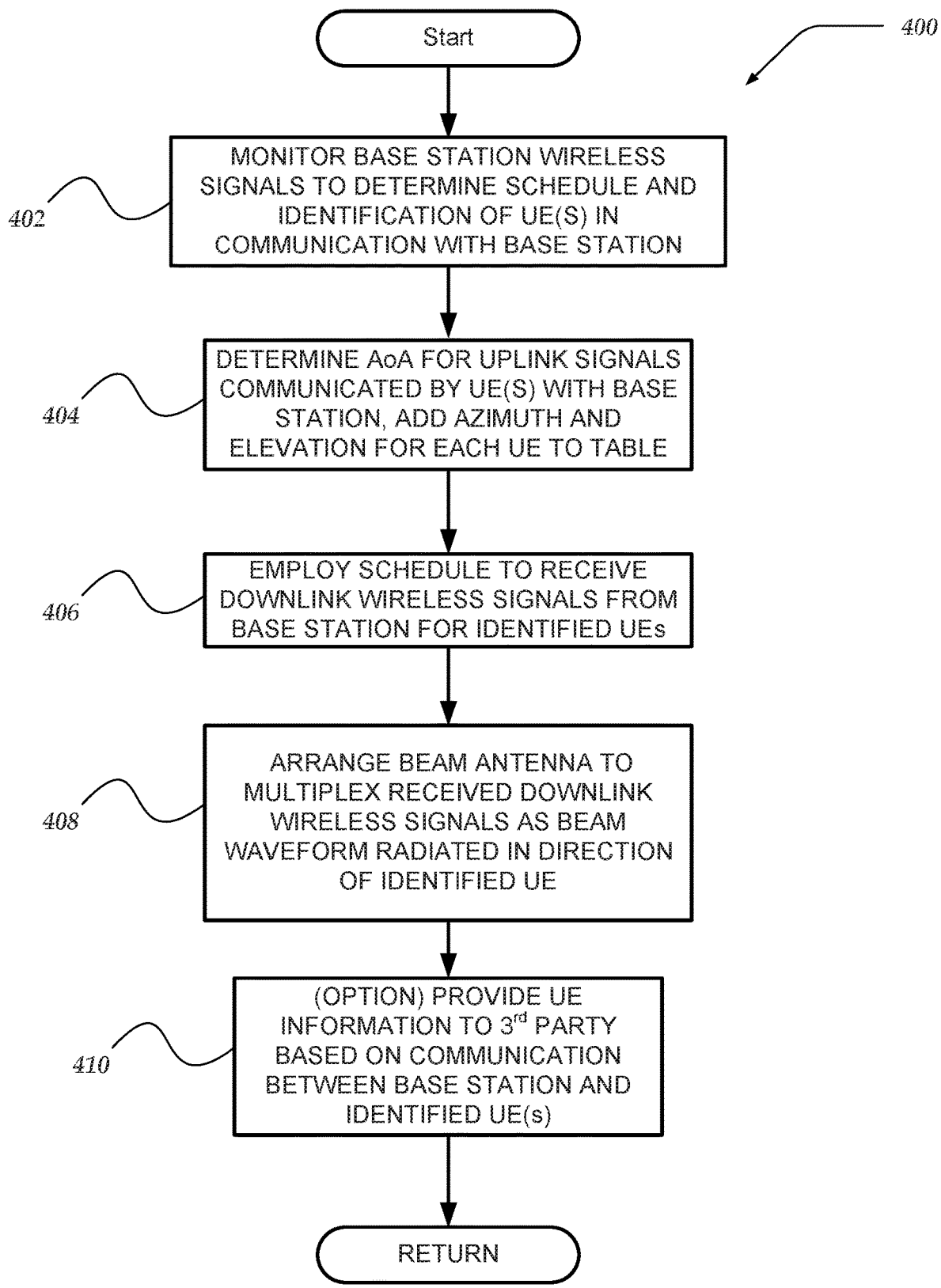
FIG. 4A illustrates an embodiment of a logical flow diagram for an exemplary method of improving downlink communication of wireless signals from a remotely located base station to a plurality of user wireless devices (UEs)

FIG. 4A illustrates a logical flow diagram of for an exemplary method of improving downlink communication of wireless signals from a remotely located base station to a plurality of user wireless devices (UEs). Moving from a start block, the process steps to block 402 where a download protocol decoder component monitors base station wireless signals to determine an allocation schedule that identifies one or more of the UEs that are currently communicating with the remote base station.

Advancing to block 404, angle of arrival (AoA) information is determined for uplink wireless signals communicated by one or more identified UEs to a remotely located base station. The one or more UEs are identified in the allocation schedule provided by the base station. Also, the AoA information includes azimuth and elevation for each identified UE communicating with the remotely located base station.

At block 406, the schedule is employed to receive downlink wireless signals communicated to each identified UE on the schedule at their allocated time period. Further, the process advances to block 408 where the received downlink signals for each identified UE are proxied and retransmitted as beam waveforms radiated in a direction defined by the AoA information and the allocated time periods in the schedule.

At block 410, different types of information may be determined regarding one or more UEs that receive retransmitted downlink wireless signals from the remote base station in a beam waveform. The different types of information may include a wireless service provider/carrier associated with the one or more UEs, a determined location of each UE, an amount and frequency of downlink wireless signals retransmitted to each UE, or the like. Also, one or more of the different types of information may optionally be provided to third parties, such as wireless service providers/ carriers, law enforcement, fire departments. Next, the process returns to performing other actions.

Figure 4B:
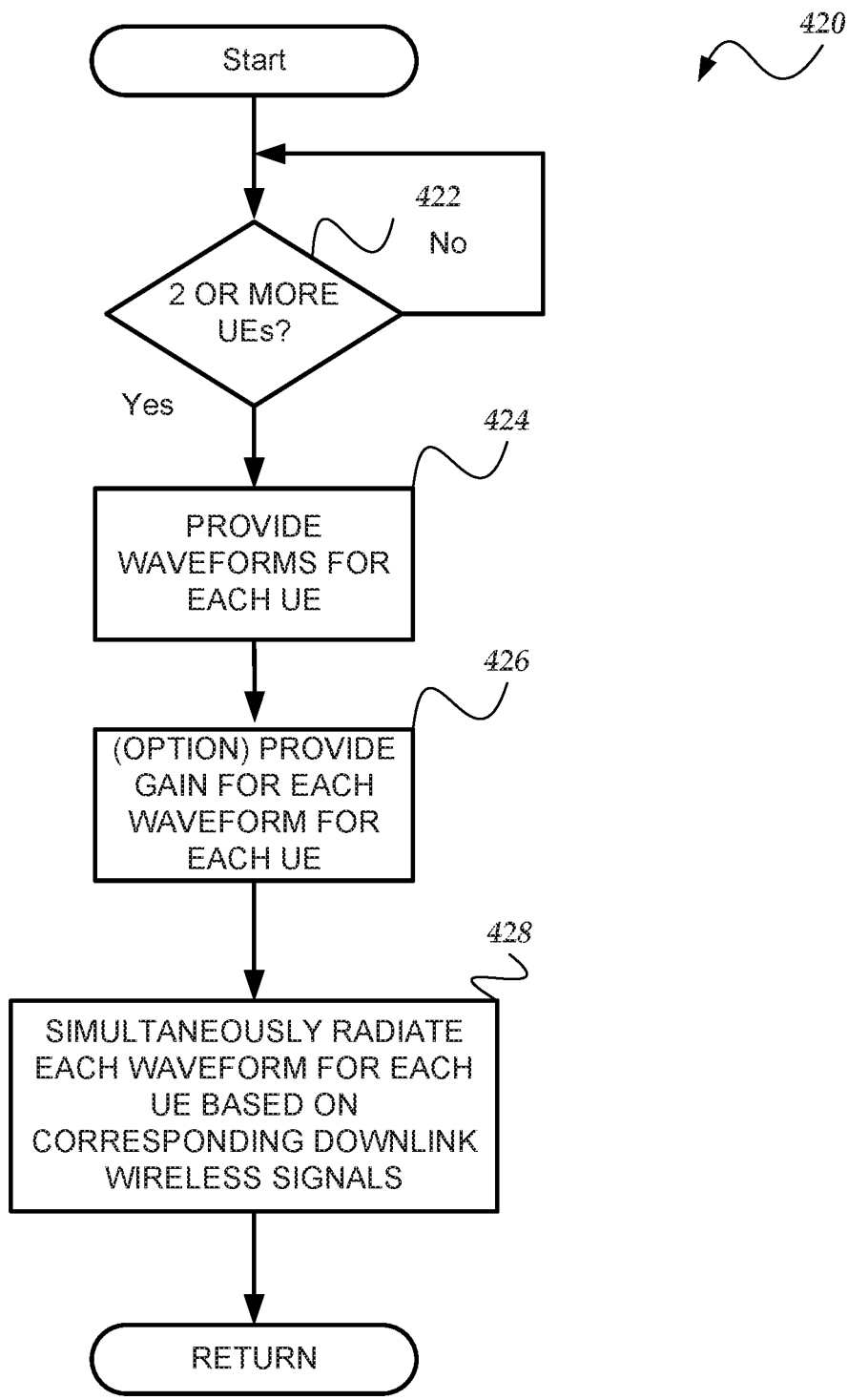
FIG. 4B shows an embodiment of a logical flow diagram for an exemplary method of simultaneously multiplexing multiple downlink wireless signals from a remotely located base station to two or more user wireless devices (UEs).

FIG. 4B illustrates a logical flow diagram of for an exemplary method 420 of simultaneously multiplexing multiple downlink wireless signals from a remotely located base station to two or more user wireless devices (UEs). Moving from a start block, the process steps to decision block 422, where a determination is made as to whether two or more UEs are identified for communication with the base schedule at overlapping time periods allocated on a schedule. If false, the process loops at decision block 422. However, once the determination at decision block 422 is true, the process moves to block 424 and a beam antenna is provided with two or more waveforms to multiplex two or more separate beams.

Optionally, at block 426 a gain of one or both of the separate beams is adjusted based on a strength of an uplink wireless signal communicated by one or both of the identified UEs that is less than a minimum threshold or greater than a maximum threshold. For example, if a strength of the uplink wireless signal communicated by an identified UE is below a minimum strength threshold, the gain of the corresponding beam of wireless downlink signals may be increased to compensate for a determined distance of the identified UE from the antenna controller component which is based in part on the determined lower strength of the uplink wireless signal. Similarly, if the strength of the uplink wireless signal communicated by an identified UE is above a maximum strength threshold, the gain of the corresponding beam of wireless downlink signals may be decreased to compensate for a determined distance of the identified UE from the antenna controller component which is based in part on the determined higher strength of the uplink wireless signal.

Next, the process flows to block 428 where, at overlapping time periods in a pointing schedule allocated for communication with the base station, the two or more separate beams are radiated in different directions defined by two or more azimuth and elevation coordinate pairs that correspond to the two or more identified UE. Further, in one or more embodiments, the beam antenna may include N separate beam forming antennas that employ N waveforms to generate and multiplex N separate beams in N different directions defined by N azimuth and elevation coordinate pairs that correspond to N identified UEs at overlapping time periods allocated in the pointing schedule.

Optionally, in one or more embodiments, the beam antenna may include both a beam forming antenna and an omnidirectional/sector directional antenna to provide communication with an identified UE from either antenna, or both, at the same allocated time in the schedule. The process may employ the two antennas to determine which antenna is able to provide optimal communication of wireless downlink signals to an identified UE, e.g., highest bandwidth with the lowest latency. Once the optimal determination is made for the identified UE, the process may use the determined antenna for further communication with the UE. Further, the process may optionally employ both a beam forming antenna and an omnidirectional/sector directional antenna to simultaneously provide communication of wireless downlink signals to two identified UEs that are allocated overlapping time periods in the pointing schedule. Also, the process may employ one or more policies to prioritize which of the two antennas provides communication with each of two identified UEs that have overlapping time periods allocated in the pointing schedule. Also, the process may optionally employ N beam forming antennas and N omnidirectional/sector directional antennas to simultaneously provide communication of wireless downlink signals to N identified UEs that are allocated overlapping time periods in the pointing schedule.

Next, the process moves to the return block and returns to performing other actions.

Additionally, it will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A device for providing communication of wireless signals with a plurality of user devices (UE), comprising:
   a downlink protocol detector component that monitors wireless signals communicated by a base station to identify and decode a protocol for wireless control signals included in the monitored wireless signals, wherein the decoded protocol for the wireless control signals is used to separately identify each UE and determine an allocation schedule that includes allocated transmit/receive time periods in the allocation schedule for each identified UE to communicate wireless signals between the base station and each identified UE;
   an angle of arrival (AoA) detector component that uses the allocation schedule to determine an azimuth and an elevation for uplink wireless signals that are communicated by each identified UE to the base station during each identified UE's allocated transmit/receive time period;
   an antenna controller component that employs the allocated transmit/receive time period in the allocation schedule and the determined azimuth and the determined elevation for each identified UE to arrange a beam antenna to multiplex generation of a beam in a determined direction of each identified UE based on downlink wireless signals communicated by the base station to each identified UE; and
   a controller that performs actions, including managing operation of one or more of the downlink protocol detector component, the AoA detector component, and the antenna controller component to provide an increase in downlink wireless signals that are received by one or more identified UEs over time.

2. The device of claim 1, further comprising one or more of:
   an interface provided by the device that is directly coupled to the base station, wherein the interface provides communication of the wireless signals between the device and the base station; or
   an RF input that is physically connected to a radio frequency (RF) downlink port of the base station, wherein the physical connection includes one or more of a waveguide, a coaxial cable, or another conductive component that is arranged to communicate wireless signals between the RF input and the RF downlink port.

3. The device of claim 1, wherein the controller performs further actions, comprising:
   determining a gain of the uplink wireless signals that correspond to each identified UE; and
   employing the gain to determine another gain that is used by the antenna controller component to radiate each beam waveform in the determined direction of each identified UE.

4. The device of claim 1, wherein the controller performs further actions, comprising:

determining a gain of the uplink wireless signals that correspond to each identified UE; and employing the determined gain and the determined direction for each identified UE to determine a distance to each location of each identified UE.

5. The device of claim 1, wherein the controller performs further actions, comprising:

determining a carrier associated with each identified UE based on a determination of one or more frequencies of the wireless signals communicated between the each identified UE and the base station.

6. The device of claim 1, wherein the controller performs further actions, comprising:

providing, to one or more third parties, one or more of a determined location for each identified UE or a wireless service provider carrier associated with each identified UE or non-identified UEs.

7. The device of claim 1, further comprises one or more of:

a first non-beam antenna arranged to at least receive downlink wireless signals from the base station;

a second non-beam antenna arranged to retransmit at least a portion of received downlink wireless signals from the base station to one or more of the identified UEs; or another beam antenna arranged to receive a beam waveform that is based on downlink wireless signals communicated by the base station.

8. The device of claim 1, further comprising:

an orientation detector component that is arranged to determine a physical position of one or more of the beam antenna or the device, wherein the orientation detector component includes one or more of an accelerometer, a gyroscope, a compass, an altimeter, or a global positioning system (GPS) component.

9. The device of claim 1, wherein the antenna controller performs further actions, including:

employing the beam antenna to simultaneously radiate two or more beam waveforms in two or more different directions corresponding to two or more identified UEs based on two or more different downlink wireless signals from the base station that separately correspond to the two or more identified UEs.

10. The device of claim 1, wherein beam antenna further comprises two or more beam antennas that are employed to simultaneously radiate two or more beam waveforms in two or more different directions corresponding to two or more identified UEs based on two or more different downlink wireless signals from the base station that separately correspond to the two or more identified UEs.

11. The device of claim 1, wherein the beam antenna is one or more of a holographic beam forming (HBF) antenna, a parabolic antenna, a spherical antenna, a helical antenna, a yagi antenna, horn antenna, or phased array antenna.

12. A method for providing communication of wireless signals with a plurality of user devices (UE) by performing actions, comprising:

employing a downlink protocol detector component to monitor wireless signals communicated by a base station to identify and decode a protocol for wireless control signals included in the monitored wireless signals, wherein the decoded protocol for the wireless control signals is used to separately identify each UE and determine an allocation schedule that includes allocated transmit/receive time periods in the allocation schedule for each identified UE to communicate wireless signals between the base station and each identified UE;

employing an angle of arrival (AoA) detector component to use the allocation schedule to determine an azimuth and an elevation for uplink wireless signals that are communicated by each identified UE to the base station during each identified UE's allocated transmit/receive time period; and employing an antenna controller component to use the allocated transmit/receive time period in the allocation schedule and the determined azimuth and the determined elevation for each identified UE to arrange a beam antenna to multiplex generation of a beam in a determined direction of each identified UE based on downlink wireless signals communicated by the base station to each identified UE; and employing a controller to performs actions, including managing operation of one or more of the downlink protocol detector component, the AoA detector component, and the antenna controller component to provide an increase in downlink wireless signals that are received by one or more identified UEs over time.

13. The method of claim 12, further comprising:

an interface provided by the device that is directly coupled to the base station, wherein the interface provides communication of the wireless signals between the device and the base station; or an RF input that is physically connected to a radio frequency (RF) downlink port of the base station, wherein the physical connection includes one or more of a waveguide, a coaxial cable, or another conductive component arranged to communicate wireless signals between the RF input and the RF downlink port.

14. The method of claim 12, wherein the controller performs further actions, comprising:

determining a gain of the uplink wireless signals that correspond to each identified UE; and employing the gain to determine another gain that is used by the antenna controller component to radiate each beam waveform in the determined direction of each identified UE.

15. The method of claim 12, wherein the controller performs further actions, comprising:

determining a gain of the uplink wireless signals that correspond to each identified UE; and employing the determined gain and the determined direction for each identified UE to determine a distance to each location of each identified UE.

16. The method of claim 12, wherein the controller performs further actions, comprising:

determining a carrier associated with each identified UE based on a determination of one or more frequencies of the wireless signals communicated between the each identified UE and the base station.

17. The method of claim 12, wherein the controller performs further actions, comprising:

providing, to one or more third parties, one or more of a determined location for each identified UE or a wireless service provider carrier associated with each identified UE or non-identified UEs.

18. The method of claim 12, further comprises one or more of:

employing a first non-beam antenna to receive at least downlink wireless signals from the base station;

employing a second non-beam antenna to retransmit at least a portion of received downlink wireless signals from the base station to one or more of the identified UEs; or employing another beam antenna to receive a beam waveform that is based on downlink wireless signals communicated by the base station.

19. The method of claim 12, further comprising:
employing an orientation detector component to determine a physical position of at least the beam antenna, wherein the orientation detector component includes one or more of an accelerometer, a gyroscope, a compass, an altimeter, or a global positioning system (GPS) component.

20. The method of claim 12, wherein the antenna controller performs further actions, including:
employing the beam antenna to simultaneously radiate two or more beam waveforms in two or more different directions corresponding to two or more identified UEs based on two or more different downlink wireless signals from the base station that separately correspond to the two or more identified UEs.

21. The method of claim 12, wherein beam antenna further comprises two or more beam antennas that are employed to simultaneously radiate two or more beam waveforms in two or more different directions corresponding to two or more identified UEs based on two or more different downlink wireless signals from the base station that separately correspond to the two or more identified UEs.

22. The method of claim 12, wherein the beam antenna is one or more of a holographic beam forming (HBF) antenna, a parabolic antenna, a spherical antenna, a helical antenna, a yagi antenna, horn antenna, or phased array antenna.

23. A system for providing communication of wireless signals with a plurality of user devices (UE), comprising:
a base station that is arranged to communicate wireless signals with the plurality of UEs;
a device that is in communication with the base station and the plurality of UEs, wherein the device includes:
a downlink protocol detector component that monitors wireless signals communicated by a base station to identify and decode a protocol for wireless control signals included in the monitored wireless signals, wherein the decoded protocol for the wireless control signals is used to separately identify each UE and determine an allocation schedule that includes allocated transmit/receive time periods in the allocation schedule for each identified UE to communicate wireless signals between the base station and each identified UE;
an angle of arrival (AoA) detector component that uses the allocation schedule to determine an azimuth and an elevation for uplink wireless signals that are communicated by each identified UE to the base station during each identified UE's allocated transmit/receive time period; and
an antenna controller component that employs the allocated transmit/receive time period in the allocation schedule and the determined azimuth and the determined elevation for each identified UE to arrange a beam antenna to multiplex generation of a beam in a determined direction of each identified UE based on downlink wireless signals communicated by the base station to each identified UE; and
a controller that performs actions, including managing operation of the downlink protocol detector component, the AoA detector component, and the antenna controller component to provide an increase in downlink wireless signals that are received by one or more identified UEs over time.

24. The system of claim 23, further comprising one or more of:
an interface provided by the device that is directly coupled to the base station, wherein the interface provides direct communication of the wireless signals between the device and the base station; or
an RF input that is physically connected to a radio frequency (RF) downlink port of the base station, wherein the physical connection includes one or more of a waveguide, a coaxial cable, or another conductive component that is arranged to communicate wireless signals between the RF input and the RF downlink port.

25. The system of claim 23, wherein the controller performs further actions, comprising:
determining a gain of the uplink wireless signals that correspond to each identified UE; and
employing the gain to determine another gain that is used by the antenna controller component to radiate each beam waveform in the determined direction of each identified UE.

26. The system of claim 23, wherein the controller performs further actions, comprising:
determining a gain of the uplink wireless signals that correspond to each identified UE; and
employing the determined gain and the determined direction for each identified UE to determine a distance to each location of each identified UE.

27. The system of claim 23, wherein the controller performs further actions, comprising:
determining a carrier associated with each identified UE based on a determination of one or more frequencies of the wireless signals communicated between the each identified UE and the base station.

28. The system of claim 23, wherein the controller performs further actions, comprising:
providing, to one or more third parties, one or more of a determined location for each identified UE or a wireless service provider carrier associated with each identified UE or non-identified UEs.

29. The system of claim 23, wherein the antenna controller performs further actions, including:
employing the beam antenna to simultaneously radiate two or more beam waveforms in two or more different directions corresponding to two or more identified UEs based on two or more different downlink wireless signals from the base station that separately correspond to the two or more identified UEs.

30. The system of claim 23, wherein the device further comprises:
an orientation detector component that is arranged to determine a physical position of one or more of the beam antenna or the device, wherein the orientation detector component includes one or more of an accelerometer, a gyroscope, a compass, an altimeter, or a global positioning system (GPS) component.

* * * * *